United States Patent [19]

Martner

[11] 4,208,001
[45] Jun. 17, 1980

[54] ULTRASONIC METAL WELDING APPARATUS

[75] Inventor: John G. Martner, St. Charles, Ill.

[73] Assignee: Dukane Corporation, St. Charles, Ill.

[21] Appl. No.: 1,292

[22] Filed: Jan. 5, 1979

[51] Int. Cl.² .............................................. B23K 21/02
[52] U.S. Cl. .................................... 228/1 R; 156/73.1
[58] Field of Search ....................................... 228/1 R; 156/73.1–73.4

[56] References Cited

U.S. PATENT DOCUMENTS

| | | | |
|---|---|---|---|
| 2,946,119 | 7/1960 | Jones et al. | 228/1 X |
| 3,017,792 | 1/1962 | Elmore et al. | 228/1 |
| 3,184,842 | 5/1965 | Maropis | 228/1 X |
| 3,436,005 | 4/1969 | Van Der Burgt | 228/1 |
| 3,752,380 | 8/1973 | Shoh | 228/1 |
| 3,813,006 | 5/1974 | Holze, Jr. et al. | 228/1 |

OTHER PUBLICATIONS

"Ultrasonic Welding of Metals", *Ultrasonics*, Jul.–Sep. 1965, pp. 128–135.
"Ultrasonic Welding", *Ultrasonics*, Oct.–Dec. 1965, pp. 190–196.
"Ultrasonic Welding", by J. Byron Jones, Aeroprojects Incorporated, pp. 1387–1410.

Primary Examiner—Francis S. Husar
Assistant Examiner—K. J. Ramsey
Attorney, Agent, or Firm—Vogel, Dithmar, Stotland, Stratman & Levy

[57] ABSTRACT

Apparatus for use with an ultrasonic plastic welder in which an ultrasonic horn on a movable welding head produces sonic vibrations along a first axis generally normal to the contacting surfaces of the workpieces to be welded together, the apparatus rendering the welder suitable for welding metals. The apparatus includes a coupling member removably connected to the distal end of the horn and extending transversely thereof and having coupled thereto a workpiece-engaging member capable of adjustment along a second axis parallel to the first axis. A force-applying member is connected to the welding head and extends therefrom toward the workpieces, with the workpiece-engaging member being adjusted to contact the lower end of the force-applying member at a fulcrum point so that axial vibration of the coupling means by the horn serves to pivot the workpiece-engaging member about the fulcrum point to effect a vibration transverse to the first axis at the contacted workpiece. Static force is applied to the workpieces along the second axis by the movable head acting through the force-applying member and the workpiece-engaging member.

19 Claims, 7 Drawing Figures

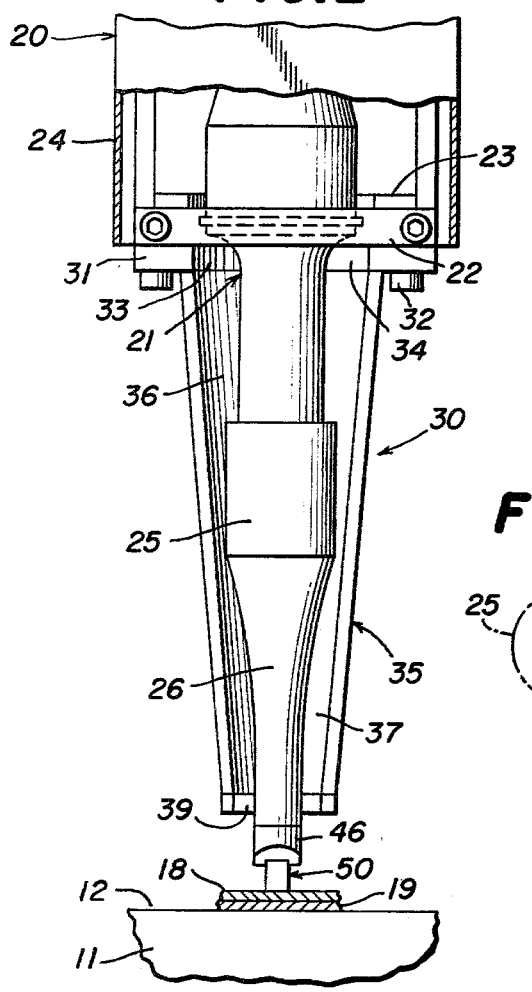
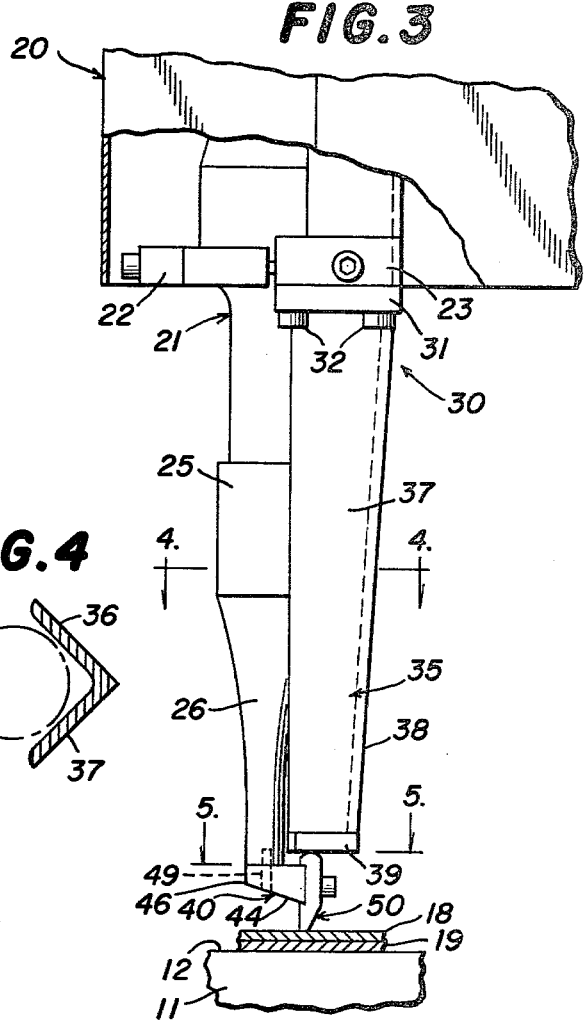
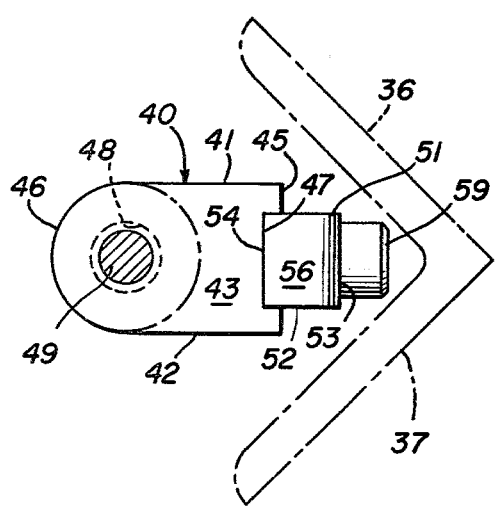
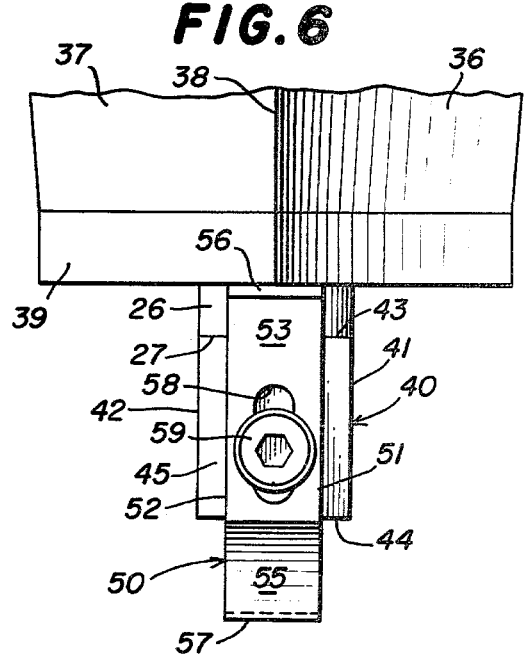

ULTRASONIC METAL WELDING APPARATUS

BACKGROUND OF THE INVENTION

The present invention relates to an improved ultrasonic welding machine for effecting metal-to-metal weldments, particularly weldments between dissimilar metals.

It is well known that ultrasonic welding between plastic materials requires the application of ultrasonic vibratory energy having a direction of vibration substantially normal to the plastic surfaces to be welded together. Similarly, it is also well known that ultrasonic welding between metal surfaces requires the application of ultrasonic energy having a direction of vibration substantially parallel to the metal surfaces being welded together. Additionally, it is essential that a static compression force be applied to urge the metal surfaces together during the welding operation.

Because of the fundamental difference in the direction of the vibratory energy with respect to the surfaces to be welded in the case of plastic welding as opposed to metal welding, prior art ultrasonic welding devices have been designed either for plastic welding or for metal welding, but not for both. Thus, a person wishing to perform both plastic and metal welding would have to use two separate welding machines, one designed for holding the workpieces with the surfaces to be welded oriented normal to the direction of vibratory energy and the other designed to hold the workpieces with the surfaces to be welded oriented substantially parallel to the direction of vibratory energy. Such a duplication of equipment could be prohibitively expensive.

Furthermore, prior art ultrasonic welding machines designed for metal welding typically apply the necessary static compressive force through the vibrational components, the static compressive force typically being exerted in a direction substantially normal to the vibratory force. Such prior art devices are disclosed, for example, in U.S. Pat. No. 3,017,792, issued to W. C. Elmore et al. on Jan. 23, 1962 and U.S. Pat No. 3,184,842, issued to N. Maropis on May 25, 1965. This application of the static compressive force and the vibratory forces in different directions through the vibratory members (horns, couplers, transducers, etc.) causes these vibratory members to sustain considerable bending forces, resulting in eventual fatigue of the vibratory members and, ultimately, failure thereof by virtue of the fatigue.

One prior art ultrasonic metal welder, disclosed in U.S. Pat. No. 2,946,119, issued to J. B. Jones et al. on July b 26, 1960 (see FIGS. 1 and 2), applies the static compressive force in a direction parallel to the vibratory force, but the static compressive force is applied through the vibration-transmitting member so that the vibrational path of that member is biased by the static compressive force. In other words, ideally if the vibration-transmitting member starts from an equilibrium position, it will vibrate equal distances below and above that equilibrium position during alternative half cycles of the vibration. But in the Jones et al. device the downward static compressive force applied through the vibration-transmitting member aids the vibrational movement in the downward direction and opposes the vibrational movement in the upward direction so that the excursions of the vibration-transmitting member below the equilibrium position are greater than the excursions above that position. This biasing of the vibrational movement can result in distortions in the resulting weld. Furthermore, the Jones et al. device is designed specifically for use in metal bonding and is not susceptible of use in plastic welding.

SUMMARY OF THE INVENTION

The present invention is directed to an improved ultrasonic metal welder which avoids the disadvantages of prior art devices, while affording additional structural and operational advantages.

More particularly, it is a general object of the present invention to provide apparatus for vibratory welding of workpieces which, by means of a simple field conversion, can be rendered suitable for welding either plastic or metal workpieces.

It is another object of this invention to provide apparatus for ultrasonic welding of metal workpieces, wherein the static compressional force and the vibratory forces are applied independently of each other along parallel, spaced-apart axes to a removably mounted coupling linkage which contacts the workpieces only along the static compressional force axis.

In connection with the foregoing objects, it is another object of this invention to provide apparatus of the character described, wherein the coupling linkage includes two separate members adjustably coupled to each other and removably coupled to the vibratory means.

In connection with the foregoing object, still another object of this invention is the provision of apparatus of the character described, which also includes a removably mounted support bracket for transmitting the static compressive force to and through the coupling linkage.

Still another object of this invention is the provision of conversion apparatus which, when added to a conventional ultrasonic plastic welding machine, renders that machine suitable for use in welding together metal workpieces.

These and other objects are attained by providing apparatus for vibratory welding of metal workpieces along contacting surfaces thereof, the apparatus comprising vibrating means spaced from the associated workpieces for transmitting sonic vibrations along a first axis generally normal to the contacting surfaces of the workpieces, coupling means removably coupled to the transmitting means and extending therefrom transversely of the first axis and spaced from the associated workpieces, the coupling means including a workpiece-engaging portion extending therefrom along a second axis spaced from and generally parallel to the first axis for contacting one of the associated workpieces, and force-applying means independent of the sonic vibrations and coupled to the coupling means for cooperation therewith to apply a static force through the workpiece-engaging portion to the associated workpieces along the second axis, vibration of the coupling means by the transmitting means along the first axis effecting vibration of the workpiece-engaging portion of the coupling means and the associated workpieces in a direction generally parallel to the contacting surfaces of the workpieces for welding them together.

Further features off the invention pertain to the particular arrangement of the parts of the ultrasonic welding apparatus whereby the above-outlined and additional operating features thereof are attained.

The invention, both as to its organization and method of operation, together with further objects and advantages thereof, will best be understood by reference to the following specification taken in connection wih the accompanying drawings.

Brief Description of the Drawings

FIG. 2 is an enlarged fragmentary front elevational view of the ultrasonic horn of the machine of FIG. 1, illustrating the apparatus of the present invention;

FIG. 3 is a side elevational view of the apparatus of FIG. 2, with portions broken away more clearly to show the structure of the apparatus;

FIG. 4 is a view in horizontal section taken along the line 4—4 in FIG. 3;

FIG. 5 is a further enlarged view taken along the line 5—5 in FIG. 3;

FIG. 6 is a fragmentary elevational view of the structure of FIG. 5, as viewed from the right-hand side thereof.

DESCRIPTION OF THE PREFERRED EMBODIMENT

Figure 1:
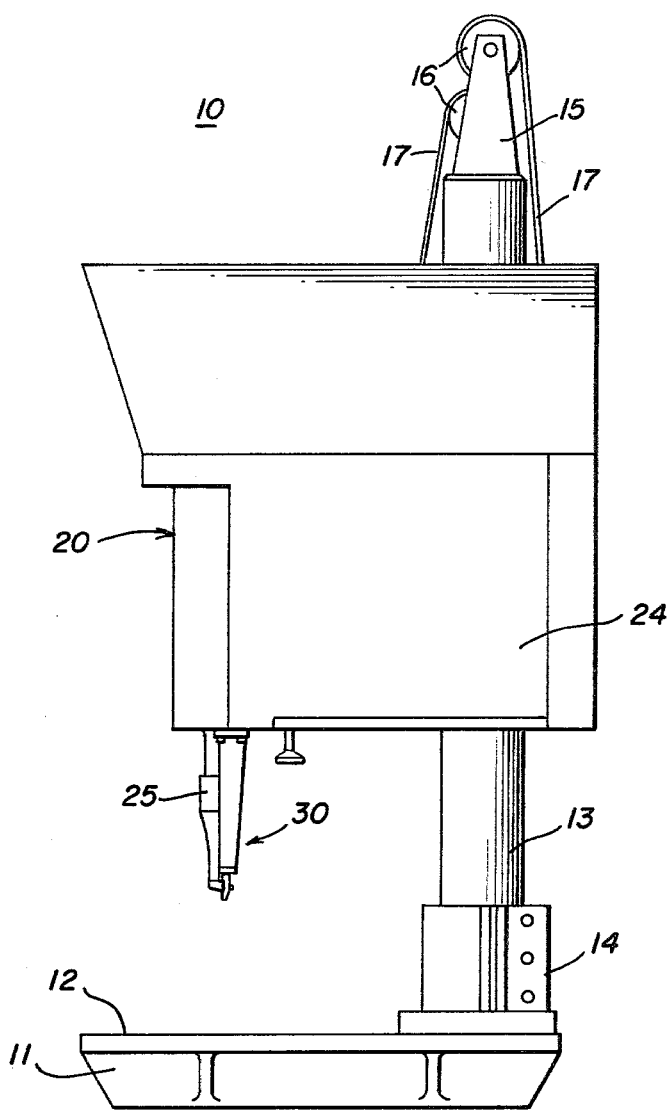
FIG. 1 is a side elevational view of an ultrasonic welding machine incorporating the apparatus constructed in accordance with and embodying the features of the present invention for adapting the machine to the welding of metal workpieces.

Referring to FIG. 1 of the drawings, there is illustrated an ultrasonic welding machine, generally designated by the numeral 10. The welding machine 10 is of the type which is normally intended for plastic welding, but which incorporates the apparatus constructed in accordance with and embodying the features of the present invention, whereby the welding machine 10 is adapted for the formation of ultrasonic weldments between metal workpieces. The welding machine 10 includes a base 11 having a flat anvil surface 12 thereon. An upright stanchion or post 13 is fixedly secured to the rear end of the base 11 as by a mounting collar 14 and extends vertically upwardly therefrom, being provided at the upper end thereof with a clevis bracket 15 having rotatably mounted therein two sheaves or rolls 16 around which are respectively wound the upper ends of two steel bands 17, the lower ends of which are coupled to the housing or frame 24 that contains, on its front end, a vertically sliding portion or thruster, generally designated by the numeral 20. Said thruster comprises a linear sliding bearing (not shown), a pneumatic cylinder that provides the static pressure (not shown) and a welding head.

In operation, two workpieces 18 and 19 which are to be welded together are stacked on the anvil surface 12, with the contracting surfaces thereof to be welded disposed substantially parallel to the anvil surface 12 (see FIGS. 2 and 3). The thruster 20 is pneumatically operated by the aforementioned cylinder and is automatically lowered, positioned against the workpieces and pressurized to provide the required static pressure for welding. The frame 24 is adapted for vertically reciprocating movement along the stanchion 13, which is preferably cylindrical in shape. For this purpose, suitable drive means are provided for effecting vertical movement of the housing or frame 24. Referring also to FIGS. 2 and 3 of the drawings, the housing or frame 24 includes electronic control circuits, pneumatic circuits, a transducer assembly and a booster assembly 21, all is well known in the art. The booster assembly 21 is positioned within the thruster 20 by means of a bracket arrangement including a front bracket member 22 and a rear bracket member 23 which are secured together by suitable threaded fasteners, the rear bracket member 23 also being fixedly secured to the thruster 20. Fixedly secured to the booster assembly 21 at the lower end thereof is a downwardly extending elongated ultrasonic horn 25 having a tapered lower end 26 which terminates in a flat circular distal end surface 27 (see FIG. 6). The bracket members 22 and 23 are located at a nodal plane of the vibratory system where no longitudinal vibrations are present, hence none are transmitted to the bracket members 22 and 23.

The aforementioned structure is typically present in a standard ultrasonic plastic welding machine. The machine 10 produces ultrasonic vibrations having a direciton of vibration axially of the ultrasonic horn 25 and, therefore, substantially normal to the contacting surfaces of the workpieces 18 and 19 to be welded together, which is the desired direction in the case of plastic workpieces. In operation, the thruster 20 is lowered until the distal end 27 of the ultrasonic horn 25 contacts the upper workpiece 18 and the vibratory energy is then applied for effecting the weldment.

Referring now also to FIGS. 4 through 7 of the drawings, there will now be described the apparatus in accordance with the present invention whereby the standard plastic welding machine is adapted for effecting welds between metal workpieces. More particularly, the welding machine 10 of the present invention includes a support bracket assembly, generally designated by the numeral 30, which includes a flat top plate 31 fixedly secured to the underside of the rear bracket member 23 by screws 32, the top plate 31 having formed at the front thereof a generally V-shaped recess defined by vertical surfaces 33 and 34 disposed substantially at right angles to each other.

Fixedly secured to the top plate 31 as by welding and extending downwardly therefrom is an angle member, generally designated by the numeral 35, which includes walls 36 and 37, the inner surfaces of which are respectively substantially flush at the upper ends thereof with the surfaces 33 and 34 of the top plate 31, the angle member 35 forming a substantially vertically extending channel which is generally V-shaped in horizontal cross section. The angle member 35 is so constructed and arranged that the walls 36 and 37 are joined together at a rear edge 38 which in inclined slightly with respect to the vertical. Fixedly secured to the angle member 35 at the lower end thereof as by welding is a flat bottom plate 39 which is generally triangular in shape and closes the lower end of the V-shaped channel formed by the angle member 35. The dimensions of the walls 36 and 37 of the angle member 35 are such that, in use, the upper portion of the horn 25 is partly recessed within the V-shaped channel formed by the angle member 35, but the support bracket assembly 30 is spaced from the horn 25 and the other vibrational components of the machine 10.

There is also provided a coupling member, generally designated by the numeral 40, which is in the form of a flat metal block generally trapezoidal in shape, the coupling member 40 having parallel side surfaces 41 and 42 which are disposed substantially vertically in use, and are joined at the upper ends thereof by a flat top surface 43 and at the lower ends thereof by an inclined bottom surface 44. The side surfaces 41 and 42 are also joined at the rear end thereof by a vertical flat rear surface 45, and are joined at the front end thereof by an arcuate, part-cylindrical front surface 46. Preferably, the front surface 46 has a radius which is substantially equal to the radius of the distal end surface 27 of the ultrasonic horn 25, the coupling member 40 being disposed in use with the top surface 43 thereof flush against the distal end surface 27 of the horn 25 and with the arcuate front surface 46 thereof coaxial with the horn 25. The inclined bottom surface 44 slopes downwardly from the arcuate front surface 46 toward the flat rear surface 45, the latter being disposed toward the support bracket assembly 30.

The flat rear surface 45 has formed therein a vertically extending channel or groove 47 rectangular in transverse cross section for a purpose to be described below. Extending vertically through the coupling member 40 between the top and bottom surfaces 43 and 44 thereof coxially with the arcuate front surface 46 is an internally threaded aperture 48 for receiving therethrough a screw 49, which is in turn received in a complementary internally threaded axial opening in the lower end fo the horn 25 for fastening the coupling member 40 to the horn 25. Preferably, the horn 25 and coupling member 40 ar so dimensioned and arranged that the effective or tuned length of the horn 25 includes the vertical thickness of the coupling member 40.

A work-engaging tool, generally designated by the numeral 50, is formed of a block of metal and includes parallel side surfaces 51 and 52 which are disposed substantially vertically in use and are joined at the rear and front ends thereof by parallel rear and front surfaces 53 and 54, the rear surface 53 having an inclined lower end portion 55 which slopes downwardly toward the front surface 54 and is joined thereto at the lower ends thereof by a toothed or serrated bottom surface 57. Formed at the upper end of the work-engaging tool 50 is an arcuate part-cylindrical top surface 56, the axis of which is horizontal and normal to the side surfaces 51 and 52. Extending through the tool 50 between the rear and front surfaces 53 and 54 thereof is a vertically-elongated slot or aperture 58.

In use, the tool 50 is so dimensioned and arranged that the front surface 54 thereof is slidably receivable in the groove 47 of the coupling member 40, and is secured thereto by means of a screw 59 which is receivable through the slot 58 and is threadedly engaged in a complementary opening (not shown) in the coupling member 40. it will be appreciated that, by loosening of the screw 59, the position of the tool 50 can be vertically adjusted, and then fixedly held in the adjusted position by tightening of the screw 59. Preferably, the tool 50 is so adjusted that, when the parts of the welding machine 10 are assembled, the top surface 56 of the tool 50 is disposed in firm contact with the bottom surface of the bottom plate 39 of the support bracket assembly 30. When so arranged, the serrated bottom surface 57 will project a predetermined slight distance below the lowermost portion of the coupling member 40.

Figure 7:
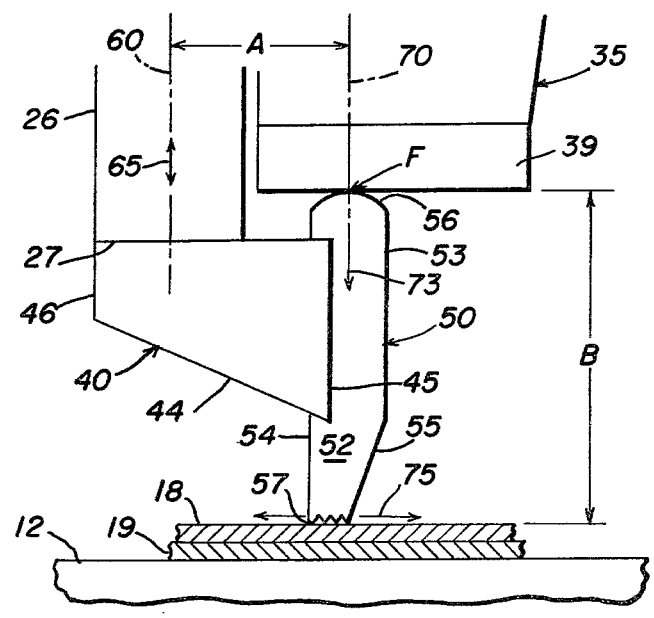
FIG. 7 is a partially diagrammatic side elevational view of the apparatus of FIG. 6, as viewed from the left-hand side thereof, illustrating the location and direction of the various forces in the apparatus of the present invention

Referring now in particular to FIG. 7 of the drawings, the operation of the ultrasonic welding machine 10 of the present invention in the welding of metal workpieces will be described. As explained above, the parts are assembled with the support bracket assembly 30 fixedly secured to the welding head 20 but independent of the ultrasonic vibrations, with the coupling member 40 fixedly secured to the lower end of the horn 25, and with the work-engaging tool 50 fixedly secured to the coupling member 40 and adjusted so as to be in firm contact with the lower end of the support bracket assembly 30, this point of contact forming a fulcrum point designated by the letter F in FIG. 7. The vertical axis of the horn 25 is designated by the numeral 60, it being appreciated that the horn 25 produces ultrasonic vibrations, the direction of vibration of which are vertically up and down along the axis 60, as indicated by the arrows 65. The fulcrum point F lies along a second vertical axis 70 which extends upwardly through the support bracket assembly 30 and is spaced a finite distance A from the horn axis 60.

The metal workpieces 18 and 19 to be welded together, which are illustrated in the drawings as being flat metal plates, are disposed on the anvil surface 12 with their contacting surfaces which are to be welded together disposed substantially horizontally, i.e., substantially normal to the axes 60 and 70. The thruster 20 is lowered until the serrated bottom surface 57 of the tool 50 is in contact with the upper workpiece 18, the thruster 20 applying a downward compressional force along the axis 70 in the direction of the arrowhead 73 through the support bracket assembly 30 and the work-engaging tool 50 for cooperation with the base 11 securely to clamp the workpieces 18 and 19 together, this static compressional force being an essential element of ultrasonic welding of metal workpieces. Thus, it will be appreciated that this static compressional force is parallel to the direciton of the vibratory motion but is separated from the horn 25 and the other vibratory components, thereby to avoid the bending stresses and/or the biasing forces which are imposed upon the vibratory components by prior art devices.

When the parts are disposed in the configuration illustrated in FIG. 7, with the workpieces 18 and 19 firmly clamped against the anvil surface 12, the ultrasonic vibrational energy is applied to the front end of the coupling member 40 by the horn 25. This vibrational vertical movement of the front end of the coupling member 40 creates a rocking movement of the work-engaging tool 50 about the fulcrum point F, resulting in a horizontal back and forth or lateral movement of the work-engaging tip of the tool 50 in the direction indicated by the arrows 75. This horizontal vibrational movement is transmitted to the workpieces 18 and 19, serving to effect the welding of the workpieces 18 and 19 along the contacting surfaces thereof in a well-known manner. In other words, the combination of the coupling member 40 and the work-engaging tool 50 forms a linkage which acts like a bell carnk pivoting about the fulcrum point F to convert vertical movement to horizontal movement.

Because the vibratory forces and the static compressional force are separated from each other, the ultrasonic horn 25 does not "see" the compressional force. Were the compressional force to be applied through the horn 25, the static compressional force would bias the vibrational movement of the ultrasonic horn 25, since on the upward half cycle of horn movement the compressional static force would be pushing against or counteracting the horn movement, which on the downward half cycle of vertical horn movement, the compressional force would be aiding the horn movement. In the apparatus of the present invention, the vibrational path of the ultrasonic horn 25 is purely sinusoidal in nature, unbiased by the static compressional force.

A significant advantage of the present invention is that the support bracket assembly 30, the coupling member 40 and the work-engaging tool 50 are all removable and, therefore, are replaceable with members of like function but different sizes or shapes to facilitate specific welding applications. Thus, for example, by proper selection of the size and shape of the work-engaging tool 50, the apparatus may be made to conform to different weldment shapes and metal configurations, and to reach into tight places and the like. Furthermore, of course, by complete removal of the support bracket assembly 30, the coupling member 40 and the work-engaging tool 50, the ultrasonic welding machine 10 may be used in a standard plastic-welding configuration, wherein the ultrasonic horn 25 directly contacts the workpieces for imparting vertical or axial vibrations thereto. it will be appreciated that, when the ultrasonic welding machine 10 is used in the metal welding configuration illustrated in the drawings, it may be desirable to utilize a slightly shorter ultrasonic horn 25 than would normally be used for plastic welding, in order to allow for the fact that the tuned length of the vibrating system now includes the vertical thickness of the coupling member 40.

An important advantage of the present invention is that it not only permits conversion of vertical vibrations to horizontal vibrations, but is also permits motion amplification at the working end fo the work-engaging tool 50. This is achieved by simply varying the physical length of the tool 50, indicated in FIG. 7 by the dimension B between the fulcrum point F and the workpieces. Thus, it will be appreciated that if the dimension A is equal to the dimension B, the horizontal movement of the working end of the tool 50 at the workpiece 18 in the direction of the arrows 75 will be equal to the vertical movement of the coupling member 40 along the axis 60. If, however, the dimensions A and B are different, the resulting motion at the working end of the tool 50 will be either amplified or reduced according to the ratio of the dimensions. Thus, if A/B > 1, there is amplitude reduction at the working end of the tool 50 while, if A/B < 1, there is motion amplification at the working end of the tool 50.

In a constructional model of the present invention, the support bracket assembly 30, the coupling member 40 and the work-engaging tool 50 are all formed of metal, with the bottom plate 39 of the support bracket assembly 30 and the tool 50 preferably being hardened to support the static compressional force applied therethrough. While the specific shapes of the parts of the apparatus of the present invention have been illustrated in their preferred forms, it will be understood that alternative shapes and sizes could be used, as long as the basic operating principles of the invention are adhered to. Thus, the axes 60 and 70 must be separated, the static compressional force must be applied only along the axis 70 and be independent of the vibrational forces, and the apparatus should contact the workpiece only along the axis 70.

From the foregoing, it can be seen that there has been provided an improved ultrasonic welding machine which is suitable for welding not only plastic workpieces, but also metal workpeices. More particularly, there has been provided an improved ultrasonic welding machine which permits conversion of vibrational energy in a direction normal to the surfaces to be welded to a vibratory energy in a direction substantially parallel to the surfaces to be welded, all while applying to the workpieces a static compressional force which is separated from and not "seen" by the vibrational components of the system.

While there has been described what is at present considered to be the preferred embodiment of the invention, it will be understood that various modifications may be made therein and it is intended to cover in the appended claims all such modifications as fall within the true spirit and scope of the invention.

What is claimed is:

1. Apparatus for vibratory welding of metal workpieces along contacting surfaces thereof, said apparatus comprising vibrating means spaced from the associated workpieces for transmitting sonic vibrations along a first axis generally normal to the contacting surfaces of the workpieces, coupling means removably coupled to the transmitting means and extending therefrom transversely of the first axis and spaced from the associated workpieces, said coupling means including a workpiece-engaging portion extending therefrom along a second axis spaced from and generally parallel to the first axis for contacting of the associated workpieces, and force-applying means independent of the sonic vibrations and coupled to said coupling means for cooperation therewith to apply a static force through said workpiece-engaging portion to the associated workpieces along said axis, vibration of said coupling means by the transmitting means along the first axis effecting vibration of said workpiece-engaging portion of said coupling means and the associated workpieces in a direction generally parallel to the contacting surfaces of the workpieces for welding them together.

2. The apparatus of claim 1, wherein said coupling means is coupled to said vibrating means at the point thereof closest to the associated workpieces.

3. The apparatus of claim 1, wherein said coupling means is secured to said vibrating means by a threaded fastener.

4. The apparatus of claim 1, wherein said coupling means is formed of metal.

5. The apparatus of claim 1, wherein said coupling means is generally in the shape of a triangle having a truncated apex, said coupling means being secured adjacent to the truncated apex thereof to said vibrating means.

6. Apparatus for vibratory welding of metal workpieces along contacting surfaces thereof, said apparatus comprising vibrating means spaced from the associated workpieces for transmitting sonic vibrations along a first axis generally normal to the contacting surfaces of the workpieces, a coupling member removably coupled to the transmitting means and extending therefrom transversely of the first axis and spaced from the associated workpieces, a workpiece-engaging member connected to said coupling means and extending therefrom along a second axis spaced from and generally parallel to the first axis for contacting one of the associated workpieces, and force-applying means independent of the sonic vibrationa and coupled to said workpiece-engaging member for cooperation therewith to apply a static force therethrough to the associated workpieces along said second axis, vibration of said coupling means by the transmitting means along the first axis effecting vibration of said workpiece-engaging member and the associated workpieces in a direction generally parallel to the contacting surfaces of the workpieces for welding them together.

7. The apparatus of claim 6, wherein said workpiece-engaging member is coupled to said coupling means for movement along the second axis for adjusting the position of said workpiece-engaging member.

8. The apparatus of claim 6, wherein said workpiece-engaging member has an elongated slot therethrough aligned parallel to said second axis, and further including a setscrew receivable through said slot and threadedly engageable with said coupling means adjustably to position said workpiece-engaging member along said second axis.

9. The apparatus of claim 6, wherein said coupling means is provided with an elongated groove formed therein substantially parallel to the second axis, said workpiece-engaging member being slidably receivable in said groove adjustably to position said workpiece-engaging member along said second axis.

10. The apparatus of claim 6, wherein said workpiece-engaging member has a serrated workpiece-engaging surface to facilitate non-slipping engagement with one of the associated workpieces.

11. Apparatus for vibratory welding of metal workpieces along contacting surfaces thereof, said apparatus comprising a welding head movable toward and away from the associated workpieces in directions generally normal to the contacting surfaces thereof, vibrating means carried by said welding head for transmitting sonic vibrations along a first axis generally normal to the contacting surfaces of the workpieces, a coupling member removably coupled to the transmitting means and extending therefrom transversely of the first axis and spaced from the associated workpieces, a workpiece-engaging member connected to said coupling means and extending therefrom along a second axis spaced from and generally parallel to the first axis for contacting one of the associated workpieces and for cooperation with said coupling means to space said vibrating means from the workpieces, and a force-applying member independent of the sonic vibrations connected to said welding head and contacting said workpiece-engaging member for cooperation therewith to apply a static force therethrough to the associated workpieces along said second axis in response to movement of said head toward the workpieces, vibration of said coupling means by the transmitting means along the first axis effecting vibration of said workpiece-engaging member and the associated workpieces in a direction generally parallel to the contacting surfaces of the workpieces for welding them together.

12. The apparatus of claim 11, wherein said force-applying member is removably connected to said welding head.

13. The apparatus of claim 11, wherein said force-applying member comprises an elongated channel construction substantially V-shaped in transverse cross section, said force-applying member being so disposed as to partially accommodate said vibrating means in the open side of said V-shaped channel.

14. The apparatus of claim 11, wherein said coupling member and said workpiece-engaging member and said force-applying member are all formed of metal.

15. The apparatus of claim 11, wherein the distance along said second axis between said force-applying member and the associated workpieces is greater than the distance between the first and second axes.

16. In a machine for vibratory welding of workpieces along contacting surfaces thereof including a welding head movable toward and away from associated workpieces in directions generally normal to the contacting surfaces and carrying thereon a sonic horn for transmitting sonic vibrations along a first axis substantially parallel to the direction of movement of the head, conversion apparatus comprising coupling means removably coupled to the transmitting means and extending therefrom transversely of the first axis and spaced from the associated workpieces, said coupling means including a workpiece-engaging portion extending therefrom along a second axis spaced from and generally parallel to the first axis for contacting one of the associated workpieces and for cooperation with said coupling means to space the sonic horn from the workpieces, and a force-applying member independent of the sonic vibrations mounted on the movable welding head and contacting said coupling means for cooperation therewith to apply a static force through said workpiece-engaging poriton to the associated workpiece along said second axis, vibration of said coupling means by the transmitting means along the first axis effecting vibration of said workpiece-engaging portion of said coupling means and the associated workpiece in a direction generally normal to the first and second axes, whereby the vibration of the sonic horn generally normal to the contacting surfaces of the workpieces is converted to a vibration generally parallel to the contacting surfaces to permit welding of metal workpieces.

17. The apparatus of claim 16, wherein said force-applying member is removably mounted on the welding head.

18. The apparatus of claim 16, wherein said coupling means includes a coupling member coupled to said transmitting means and a workpiece-engaging member connected to said coupling member and extending therefrom along the second axis.

19. The apparatus of claim 18, wherein said workpiece-engaging member is coupled to said coupling member for movement with respect thereto parallel to said second axis adjustably to position said workpiece-engaging member along said second axis.

* * * * *